J. A. HODAM.
ENDLESS BELT CUTTER.
APPLICATION FILED DEC. 23, 1913.
1,175,761. Patented Mar. 14, 1916.
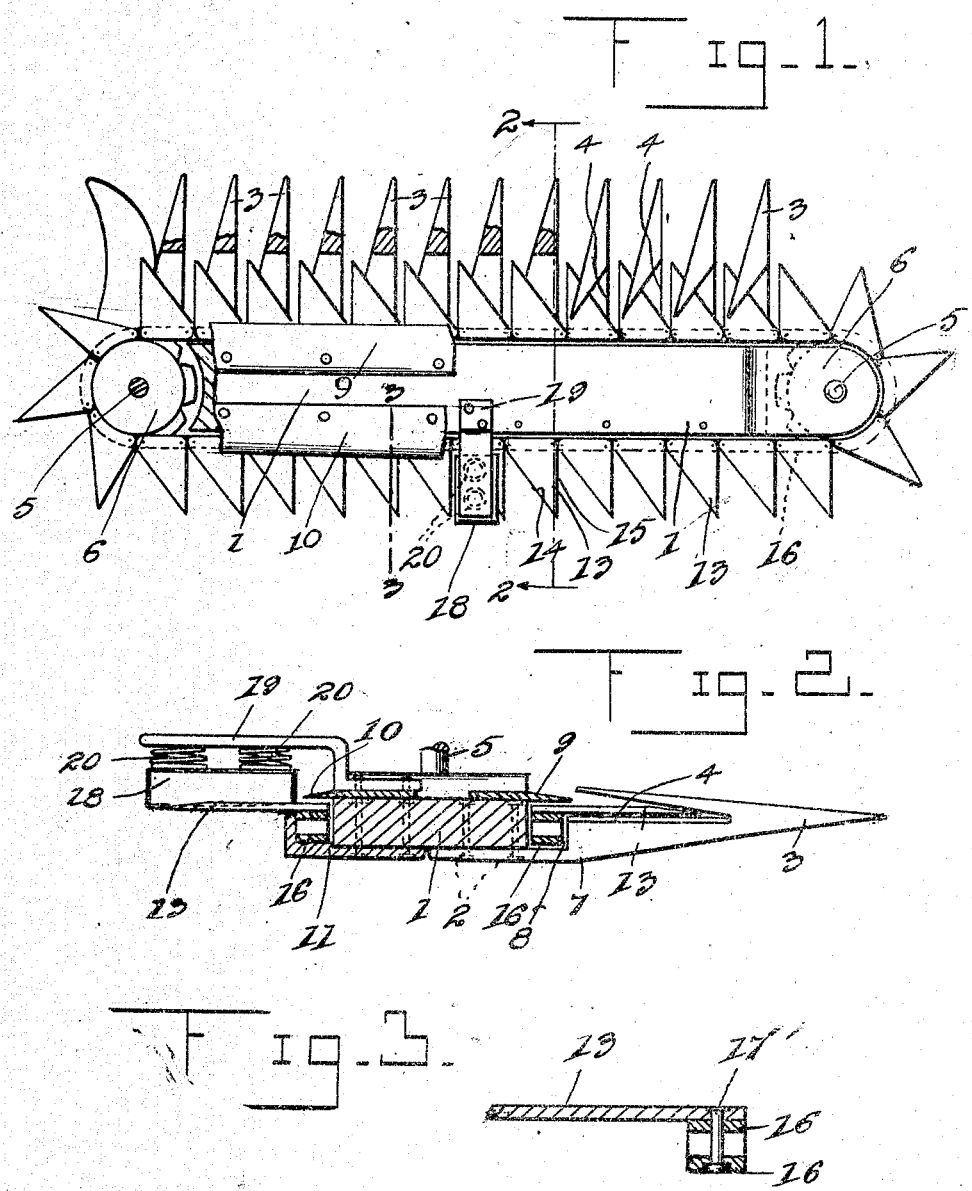
Witnesses
C Bealle
Inventor
J. A. Hodam.
By 
Attorney

UNITED STATES PATENT OFFICE.

JOSEPH A. HODAM, OF LINCOLN, NEBRASKA.

ENDLESS-BELT CUTTER.

1,175,761.   Specification of Letters Patent.   Patented Mar. 14, 1916.

Application filed December 23, 1913. Serial No. 808,329.

*To all whom it may concern:*

Be it known that I, JOSEPH A. HODAM, a citizen of the United States, residing at Lincoln, in the county of Lancaster and State of Nebraska, have invented certain new and useful Improvements in Endless-Belt Cutters; and I do hereby declare the following to be a full, clear, and exact description of the invention, such as will enable others skilled in the art to which it appertains to make and use the same.

This invention relates to endless belt cutters for use on lawn mowers, mowing machines or reaping machines, and one of the principal objects of the same is to provide an endless belt or drive chain to pass over pulleys or sprocket wheels and to be provided with extended cutters for coöperation with guards and ledger plates to be used in place of the ordinary reciprocating cutter bar of a mower or reaper, the purpose being to provide a more efficient and reliable cutter element for this character of machine.

Another object of the invention is to provide a drive chain link provided with a projecting sickle blade having an inclined cutting edge and a straight rear edge, said inclined edge adapted to coöperate with a guard and ledger plate or a number of ledger plates secured to the sickle bar in front of a mower or reaper, and means being provided for moving the blades transversely around sprocket wheels, means being also provided for sharpening the blades as they move underneath a whet-stone or other sharpening element yieldingly mounted above the return race at the rear stretch of the chain.

These and other objects may be accomplished by means of the construction illustrated in the accompanying drawings, in which,—

Figure 1 is a top plan view of an endless belt cutter made in accordance with this invention, Fig. 2 is a detail sectional view on a larger scale taken on the line 2—2 of Fig. 1 and looking in the direction indicated by the arrows, and Fig. 3 is a detail sectional view taken on the line 3—3 of Fig. 1 looking in the direction indicated by the arrow.

Referring to the drawings the numeral 1 designates the sickle bar, and connected to said bar by suitable bolts 2 are the guard members 3 with inwardly projecting plates 4.

Mounted in the sickle bar 1 near each side or end thereof are shafts 5 and on these shafts are sprocket wheels 6. Any suitable power may be provided for rotating the sprocket wheels 6.

As shown in Fig. 2 the guard members 3 are provided with offset shanks 7 which are secured underneath the sickle bar 1, and between the front edge of the sickle bar and the offset portion of said shank a race way 8 is provided for the endless belt or chain which carries the cutters. A shield 9 projects over the top of the race way to prevent displacement of the belt or chain. Guard plates 10 may be provided at the rear of the sickle bar 1 and a return race way 11 for the endless belt or chain is provided.

The cutters each comprise a plate 13 having an inclined cutting edge 14 and a straight rear edge 15. These cutters are secured to drive chain links 16 by means of suitable countersunk bolts or rivets 17.

The cutter blades 13 are beveled on their upper side on the inclined line 14. The drive chain links are adapted to be engaged by the sprockets of the sprocket wheels 6.

For sharpening the cutters as they pass around through the return race way, a whetstone 18 is connected to an overhanging bracket 19 and said whet-stone is held down into contact with the cutters by means of spring 20. Instead of the whet-stone 18 any suitable element may be used, and the bracket 19 and the sharpening element may be readily removed when not required for use.

From the foregoing it will be obvious that the cutters are moved toward the right in Fig. 1 and coöperate with the inwardly projecting plates 4 to cut the grain as the machine is moved over the ground.

Many changes in details of construction of the drive chain and the cutters may be made without departing from the spirit and scope of the invention as defined in the claim.

It will be obvious that an endless belt may be used in lieu of the drive chain for carrying the cutters over pulleys in place of the sprocket wheels.

What is claimed is:

A sharpening device for mower blades comprising an arm, an offset in said arm, a sharpening stone, coil springs adapted to have one of their ends secured to the underside of said offset in said arm and their opposite ends to said sharpening stone, whereby said sharpening stone is spaced from the underside of said offset, said arm having a plurality of apertures formed therein, and bolts fitted in said apertures, whereby said arm is secured to the cutter bar of a mowing machine.

In testimony whereof I affix my signature in presence of two witnesses.

JOSEPH A. HODAM.

Witnesses:
 THOMAS F. DOWLING.
 H. A. MEIER.